US006814911B2

(12) United States Patent
Ward et al.

(10) Patent No.: US 6,814,911 B2
(45) Date of Patent: Nov. 9, 2004

(54) METHOD AND APPARATUS FOR APPLYING ADDITIVE TO FIBROUS PRODUCTS AND PRODUCTS PRODUCED THEREBY

(75) Inventors: Bennett C. Ward, Midlothian, VA (US); Raymond J. Nelson, Powhatan, VA (US); Roy B. Pugh, Prince George, VA (US); Jackie F. Payne, Jr., Chester, VA (US); Brian V. Nutter, Chesterfield, VA (US); Michael W. Spencer, Richmond, VA (US)

(73) Assignee: Filtrona Richmond, Inc., Colonial Heights, VA (US)

( * ) Notice: Subject to any disclaimer, the term of this patent is extended or adjusted under 35 U.S.C. 154(b) by 12 days.

(21) Appl. No.: 10/384,703

(22) Filed: Mar. 11, 2003

(65) Prior Publication Data

US 2003/0222372 A1 Dec. 4, 2003

Related U.S. Application Data

(60) Provisional application No. 60/369,319, filed on Apr. 3, 2002.

(51) Int. Cl.[7] .......................... B29B 11/14; B29C 67/24
(52) U.S. Cl. ........................ 264/121; 264/109; 264/126
(58) Field of Search ................................ 264/121, 109, 264/126

(56) References Cited

U.S. PATENT DOCUMENTS 4,047,991 A * 9/1977 Buck et al. ................ 156/62.6
4,729,808 A 3/1988 Berger ........................ 156/180
4,753,843 A 6/1988 Cook et al. ................. 428/286
6,039,821 A * 3/2000 Buck ......................... 156/62.2

FOREIGN PATENT DOCUMENTS

| | | | |
|---|---|---|---|
| DE | 19725886 | 1/1998 | ............ D04H/1/56 |
| DE | 19923344 | 11/2000 | ............ D04H/1/42 |
| WO | WO 9639054 | 12/1996 | ............ A24D/3/04 |

* cited by examiner

*Primary Examiner*—Stephen J. Lechert, Jr.
(74) *Attorney, Agent, or Firm*—Hunton & Williams

(57) ABSTRACT

A method and apparatus for incorporating an additive material into a fibrous web to be bonded into an elongated porous element by heating the fibers in a confined forming die with a heating medium adapted to bond the fibers to each other at spaced points of contact. An additive material is admixed with the heating medium and then the web of fibers is contacted with the heating medium/additive material mixture whereby the heating medium simultaneously carries the additive material into the fibrous web and heats the fibers to bond them into the porous element. The apparatus includes an adjustable venturi assembly through which the heating medium passes to create a pressure gradient adapted to aspirate a quantity of additive material and entrain a metered quantity of same in the heating medium. The method and apparatus are preferably used to uniformly inject a surfactant into a stream of steam for producing an ink reservoir for a writing or marking instrument from a web of melt blown bicomponent fibers having a sheath of polyethylene terephthalate.

24 Claims, 4 Drawing Sheets

METHOD AND APPARATUS FOR APPLYING ADDITIVE TO FIBROUS PRODUCTS AND PRODUCTS PRODUCED THEREBY

This is a complete application claiming benefit of provisional application Ser. No. 60/369,319 filed Apr. 3, 2002.

BACKGROUND OF THE INVENTION

1. Technical Field

This invention relates to the production of fibrous products, and relates more particularly to methods and apparatus for the application of additives to fibrous elements during the production thereof, and to the products so-produced.

2. Discussion of the Prior Art

Various prior art techniques are known for the production of products from polymeric fibers. The polymeric fibers themselves may be produced by a number of common techniques, oftentimes dictated by the nature of the polymer and/or the desired properties and applications for the resultant fibers. Among such techniques are conventional melt spinning processes wherein molten polymer is pumped under pressure to a spinning head and extruded from spinerette orifices into a multiplicity of continuous fibers. Melt spinning is only available for polymers having a melting point temperature less than its decomposition temperature, such as nylon, polypropylene and the like, whereby the polymer material can be melted and extruded to fiber form without decomposing. Other polymers, such as the acrylics, cannot be melted without blackening and decomposing. Such polymers can be dissolved in a suitable solvent (e.g., acetate in acetone) of typically 20% polymer and 80% solvent. In a wet spinning process, the solution is pumped at room temperature through the spinerette which is submerged in a bath of liquid (e.g., water) in which the solvent is soluble to solidify the polymeric fibers. It is also possible to dry spin the fibers into hot air, rather than a liquid bath, to evaporate the solvent and form a skin that coagulates. Other common spinning techniques are well known and do not form a critical part of the instant inventive concepts.

After spinning, the fibers are commonly attenuated by withdrawing them from the spinning device at a speed faster than the extrusion speed, thereby producing fibers which are finer. The fibers may be attenuated by taking them up on nip rolls rotating at a speed faster than the rate of extrusion or between nip rolls operating at different speeds. Depending on the nature of the polymer, drawing the fibers in this manner can make them more crystalline and, thereby, stronger.

Attenuation can also be effected by contacting the fibers as they emanate from the spinerette orifices with a fluid such as high velocity air to draw the same into fine fibers, commonly collected as an entangled web of fibers on a continuously moving surface such as a conveyor belt or a drum surface, for subsequent processing. This process, known as "melt blowing", is of particular commercial importance in the production of many products because of its ability to attenuate the fibers while they are still molten.

Polymeric fibers can be formed of a single polymer or of multiple polymer components. For example, bicomponent fibers comprising a core of one polymer and a coating or sheath of a different polymer are particularly desirable for many applications since the core material may be relatively inexpensive, providing the fiber with bulk and strength, while a relatively thin coating of a more expensive or less robust sheath material may provide the fiber with unique properties.

Mono- or multi-component fibers may also be extruded in various shapes, such as circular, multi-lobal or the like. Moreover, a web of fibers having mixed characteristics can be simultaneously extruded from the same apparatus as seen, for example, in commonly assigned U.S. Pat. No. 6,103,181 (the '181 patent), the subject matter of which is incorporated herein in its entirety by reference.

Regardless of the manner of forming the fibers, they may be gathered into a sheet form which can be pleated to increase the surface area, particularly for certain filtering applications. Alternatively, a web of fibers may be gathered together and passed through a series of forming stations, such as steam-treating and cooling stations, which may bond the fibers at their points of contact to form a continuous rod-like porous element defining a tortuous path for passage of a fluid material therethrough.

The products produced from fibrous materials have many applications, for example as filter elements for use in various commercial and industrial environments, such as tobacco smoke filter elements, coalescing filters, and even high efficiency particulate air (HEPA) filters which may also function as heat and moisture exchangers for use in an artificial airway of a breathing apparatus as described in commonly assigned U.S. Pat. No. 6,330,833 (the '833 patent), the subject matter of which is also incorporated herein in its entirety by reference. Because of their high capillarity, porous fibrous products also function effectively in the production of simple wicks for transferring liquid from one place to another, as in the production of fibrous nibs found in certain marking and writing instruments. Additionally, such elements find use in diverse medical applications, for example, to transport a bodily fluid by capillary action to a test site in a diagnostic device. Other applications of fibrous products are as absorption reservoirs, products adapted to take up and simply hold the liquid as in a diaper or an incontinence pad. Absorption reservoirs are also useful in medical applications. For example, a layer or pad of such material may be used in an enzyme immunoassay test device where they will draw a bodily fluid through the fine pores of a thin membrane coated, for example, with monoclonal antibodies that interact with antigens in the bodily fluid pulled through the membrane and then held in the absorption reservoir.

Among the diverse products produced from fibrous materials, of particular commercial importance are highly porous ink reservoir elements used in marking and writing instruments where the reservoirs are designed to take up ink of various formulations and controllably release the same. Such elements have, for example, been formed of a fibrous bundle compacted together into a rod-like shaped unit having longitudinal capillary passageways which extend therethrough between the fibers and which serve to hold the ink and release it at the required rate. For many years, the material generally employed for the production of such ink reservoirs was plasticized cellulose acetate fibers which, historically, was also the material of choice for tobacco smoke filters and other such products, and which could readily be heat-bonded into a unitary body compatible with many ink formulations in use at one time.

Over the years, ink formulations have been developed that are not compatible with, and tend to degrade, cellulose acetate. Thus, various thermoplastic fibers, in particular, fine denier polyester fibers, such as polyethylene terephthalate fibers, replaced cellulose acetate as the polymer of choice in the production of ink reservoir elements for disposable writing and marking instruments. Efforts to heat-bond polyester fibers to each other in the absence of additive adhesives have not met with much success. Because of the narrow softening point of crystalline polyester polymers, it has not been feasible to commercially bond drawn polyester fibers, such as tow, with heat. Undrawn or amorphous polyester fibers are heat-bondable, but produce an unusable product which shrinks excessively during processing. Moreover, such materials lack stability in the presence of commercial inks at the temperature required for storage of writing instruments. Consequently, for some time, polyester fiber ink reservoir elements were commercially produced in the form of an unbonded bundle of fibers, compacted and held together in a rod-shaped unit by means of a film over-wrap. Depending upon the design of the writing instrument in which such reservoirs were incorporated, they could be provided with a small diameter plastic "breather" tube disposed between the fibrous bundle and the over-wrap to serve as an air release passage, if necessary.

Such film over-wrapped polyester fiber ink reservoir elements, when made with parallel continuous-filament fibers, have had adequate ink holding capacity and ink release properties for use with certain types of marking or writing instruments, primarily those employing fiber tips or nibs. Yet, with the more recent developments of roller ball writing instruments which require a faster ink release, or "wetter" system, such reservoir elements are commercially unacceptable. Attempts to increase the rate of ink release by lowering the fiber density and/or changing the fiber size, has had limited success because (1) the release was not uniform from start to finish, (2) the reduced fiber density decreased the ink-holding capacity of the reservoir, (3) the lower density polyester tow formed a very soft "rod" which was difficult to handle in the high speed automated commercial production equipment, and (4) the ink was often held so loosely that when writing instruments incorporating such reservoirs were dropped, "leakers" occurred.

To overcome such "leakers", polyester sliver having random fibers has been used which holds the ink better at lower densities. However, sliver-type polyester ink reservoir elements still tend toward undesirable softness and often suffer from unacceptable weight variations which make it difficult to control ink flow to a roller marker. Forming the reservoir from staple fibers randomly laid, rather than from continuous-filament parallel fibers, has been found to increase the ink release properties of short-length reservoirs, but at the longer length required for adequate ink holding capacity, this construction lacks the capillarity to function effectively.

Some of these prior art problems were overcome by the techniques disclosed in commonly assigned U.S. Pat. No. 4,286,005 (the '005 patent), the subject matter of which is also incorporated herein in its entirety by reference. The ink reservoir of the '005 patent provides a combination of ink-holding capacity and ink-release properties useful with various types of marking or writing instruments, including roller markers and plastic nibs. Such ink reservoirs are formed from coherent sheets of flexible thermoplastic fibrous materials comprised of an interconnecting network of randomly arranged, highly dispersed, continuous-filament junctions which has been embossed with a multiplicity of longitudinally extending parallel grooves and formed or compacted into a dimensionally stable rod-shaped body whose longitudinal axis extends parallel to the embossed grooves. Unfortunately, the ink reservoir of the '005 patent, while overcoming many problems with prior art products, required the use of relatively expensive materials, having a complex shape, and for this reason, has had limited commercial acceptance.

More commercially acceptable polyester ink reservoirs have been made by the process described in commonly assigned U.S. Pat. No. 4,729,808 (the '808 patent), the subject matter of which is also incorporated herein in its entirety by reference, which utilizes a raw material stretch yarn, often referred to as "false twist stretch yarn", which has unusual properties including the ability to stretch and curl or twist. For the most part, the product and process of the '808 patent overcame substantially all of the aforementioned problems of the prior art and, thus, achieved remarkable acceptance in the marking and writing instrument. However, false twist yarn requires the use of melt spun fibers, generally averaging over 2 denier per filament (dpf) or about 12 microns in diameter. While larger fibers are useful in some wetter systems, since larger fibers take up more volume, there is less interstitial space for holding ink and, thus, less capacity in the reservoir. Small fiber size, less than about 12 microns, which cannot be achieved with false twist yarn, provides better release pressure without reducing capacity. Higher release pressure, which minimizes leakers, a particular problem with some very low surface tension ink compositions, is difficult to realize with false twist yarn. Increasing density to improve leakers, further reduces capacity.

As noted, polyesters, such as polyethylene terephthalate, are uniquely effective in the production of ink reservoir elements because of their compatibility with many ink formulations currently in use. Yet, they are expensive compared to other polymer materials. For that reason, a process was designed to minimize the quantity of polyethylene terephthalate necessary to the production of an ink reservoir having acceptable ink holding capacity, while being capable of controllably releasing the ink in a marking or writing instrument, by providing bicomponent fibers which replace a significant portion of the polyethylene terephthalate with a lower cost polymer core that has a higher melting point, such as polypropylene or polybutylene terephthalate, such techniques being described in commonly assigned U.S. Pat. No. 5,607,766 (the '766 patent), the subject matter of which is also incorporated herein in its entirety by reference. The '766 patent describes techniques that, with careful selection of the processing parameters and materials, enables a complete polyethylene terephthalate sheath to be extruded over a less expensive thermoplastic core material to produce bicomponent fibers readily processed into highly efficient, low cost, ink reservoir elements.

The bicomponent fibers of the '766 patent are also shown to be useful in the production of many other commercially important products, such as high temperature filtration elements enabled because of the relatively high melting point of the polyester, as well as high filtration porous rods which define tortuous interstitial paths effective for capturing fine particulate material when a gas or liquid is passed therethrough, including elements having acceptable hardness, pressure drop, and resistance to draw during filtration characteristics for use in tobacco smoke filter elements. The products of the '766 patent have also found use as simple wicks as in the production of fibrous ribs for marking or writing instruments, diverse medical applications, absorption reservoirs and the like.

The preferred technique for forming the bicomponent fibers of the '766 patent, and for that matter, for forming fine fibrous materials, both mono-component and multi-component, formed of other polymeric constituents, is melt blowing, i.e., the use of a high speed, low-pressure gas stream at the exit of a fiber extrusion die to attenuate or thin out the fibers while they are in their molten state. See, for example, U.S. Pat. Nos, 3,595,245, 3,615,995 and 3,972,759 (the '245, the '995 and '759 patents, respectively), the subject matters of which are incorporated herein in their entirety by reference, for a comprehensive discussion of the melt blowing processing. Melt blowing of fibrous materials can produce a web or roving wherein the fibers have, on the average, a diameter of about 12 microns or less, down to 5 and even 1 micron. Such fine melt blown fibers have significant advantages in most of the applications mentioned above. For example, when used in the production of ink reservoirs, the small diameter fibers produce high surface area and an increased holding capacity as compared to the use of larger diameter fibers made by other techniques, and provide enhanced filtration efficiency when used in the production of filter elements by increasing the fiber surface area for the same weight of polymer.

In many instances, the fibrous products described above either require or are enhanced by the incorporation of an additive in the fibrous web during manufacture. In some instances, the bulk additive can simply be added to the polymer melt prior to extrusion. For many applications, however, this approach either is impossible or inefficient. Alternatively, it is possible to topically apply liquid surface treatments to the fibrous material during manufacture such as by soaking the fibrous materials in highly diluted solutions of the additive in an attempt to insure that adequate additive material is incorporated throughout the fibrous structure. It is these procedures with which the instant invention is concerned.

For example, in the production of porous elements made from cellulose acetate, the addition of a plasticizer is necessary to render the fibers bondable by steam during manufacture. Other bonding agents are commonly added to a fibrous web to form bonds between the fibers at their points of contact. Additionally, smoke-modifying or taste-modifying additives, such as menthol, are advantageously incorporated into the body of a tobacco smoke filter during production. The addition of selected surfactants in particular concentration to a fibrous media to be used as an ink reservoir for marking and writing instruments will modify the surface characteristics of the fibers to enhance absorptiveness and/or compatibility with particular ink formulations. As noted, wicking materials used in various medical applications may be treated with solutions of active ingredients such as monoclonal antibodies to interact with materials passed therethrough. Also, color-changing additives may be incorporated to identify the presence of particular constituents in such materials. An antibacterial additive may be added to a fibrous element to minimize problems with mildew; an active testing material may be added to a low density polyethylene sheath/polypropylene core fibrous material used in the production of a pregnancy testing wick; and a volatile medicament may be incorporated in a fibrous heat and moisture exchanger of the type described in the '833 patent.

The incorporation of other additives in the production of self-crimping yarns, banded tows or other fibrous products is well known or will be obvious to those with ordinary skill in the art. The uniform application of such additives, particularly during high speed commercial manufacturing processes and throughout layers or webs or fibrous material, is difficult to effect in an efficient and inexpensive manner, especially in melt blown webs.

A characteristic of melt blown fibrous materials, such as produced by the aforementioned prior patents, is the dry nature of the fiber surfaces. The uniform application and retention of additives to such materials is particularly difficult because prior art melt blown processes have failed to provide any methodology for applying liquid additives to a melt blown web as it is being extruded or collected. Moreover, penetration of the additives to the core of webs or slivers of such dry fibrous materials to provide a uniform quantity of the additive throughout the final product is difficult, particularly at the high speeds of commercial processing equipment. Heretofore, in order to ensure uniformity of application of such materials, they have been highly diluted as in an aqueous solution, and the fibrous webs passed through a flooded finish application die to soak the fibers with the solution and, thereby, penetrate the web with the additive. The disadvantages of such a procedure are obvious. First, there is the need to form a diluted solution of the additive material which not only adds to the labor cost, but requires an excess of additive, increasing the cost of materials, as well. Moreover, following the saturation of the web with the diluted additive solution, it is necessary to remove the excess liquid and dry the material for post-production processing. The amount of additive applied is commonly controlled by blowing the undesired solution away with an air stripping, forced air drying, or thermal oven apparatus. Due to the speed of operation, however, it is very difficult to get resultant units to emerge from a stripping die or the like fully dry. Typically, units processed in this manner are damp to the touch, making post-production processing that much more difficult and contributing to the undesirable waste of additive material. In addition, production of wet product can lead to significant down stream issues with mold or other biological growth infesting the product.

Many fibrous products are thermally bondable with hot air, saturated steam, or other fluid heating media. The bonding ability, for example, of plasticized cellulose acetate is activated by steam treatment in the production of conventional tobacco smoke filter rods and other porous elements wherein the fibers are bonded to each other at their points of contact to provide a tortuous interstitial path for the passage of a fluid such as tobacco smoke therethrough. Similarly, as described in the '766 patent, melt blown bicomponent fibers having a polyethylene terephthalate sheath and a polypropylene or the like core may be converted into an elongated, substantially self-sustaining, porous rod which may be subdivided for use, for example, as ink reservoir elements in a one-step or a continuous process because the polyethylene terephthalate sheath has the unusual property of undergoing crystallization at a temperature less than the melting temperature of the core material and, thus, the fibers are thermally bondable with heated fluid.

It would be particularly desirable to enable the uniform and high speed application of an additive material during the production of any of the fibrous products discussed hereinabove, particularly in those instances where a web of fine fibers has been melt blown, and thus produced in a dry manner eliminating the difficulty in processing such materials.

OBJECTS AND SUMMARY OF THE INVENTION

It is, therefore, a principal object of the instant invention to provide an improved method and apparatus for incorporating an additive material into a fibrous web, especially to change or alter the surface properties of the fibers, and to produce products therefrom having comparable or improved uniformity in a more efficient and inexpensive manner than possible with the prior art technology.

Consistent with the foregoing, it is an important object of this invention to provide a system which enables the application of additive materials in a manner which does not necessarily require dilution, precluding the need for flooding the fibrous web with solutions of the additive, resulting in the production of significantly drier units without the need for expensive and extensive air stripping or the like and, thereby, facilitating post-production processing with little or no wasted additive.

Yet another object of this invention is the application of an additive material to a polymeric fibrous web to alter the surface properties of the fiber using the heating medium which bonds the fibers into a finished product. More specifically, according to a preferred embodiment of this invention, where steam is used to activate the bonding characteristics of the fibers in a web, the additive material is carried into the web by the steam during the bonding step.

A further object of this invention is the provision of a method and means to produce fibrous elements which eliminates the need for additive saturation by diluted solutions and concomitant drying techniques necessary heretofore. Consistent therewith, the instant invention contemplates the application of additives utilizing the heating medium which causes bonding of the fibrous elements, such as steam, as a carrier for the additive, enabling the use of undiluted additive materials, significantly reducing the supply rates and costs for injecting additives into the fibrous material and costs resulting from extensive thermal drying or air stripping.

Another object of this invention is the provision of a unique method and apparatus for controlling the amount of additive applied to the fibrous web, using a heating fluid, such as steam, to draw a metered quantity of additive material from a source of same through an adjustable venturi, and then carrying the additive to a forming die where the heating fluid completely penetrates the fibrous material and uniformly applies the additive throughout the web while simultaneously bonding the fibers at their spaced points of contact.

In summary, a primary and basic object of this invention is to combine two previously independent processing functions, namely, the application of the additive and the heating of the fibrous material to bond the fibers to each other at spaced points of contact, providing a more commercially viable and economic manufacturing procedure and products resulting therefrom having more uniform and predictable properties.

BRIEF DESCRIPTION OF THE DRAWINGS

These and other objects, features and many of the attendant advantages of this invention will be better understood by those with ordinary skill in the art in connection with the following detailed description of the preferred embodiments which refers to the accompanying drawings wherein.

Like reference characters refer to like parts throughout the several views of the drawings.

Figure 1:
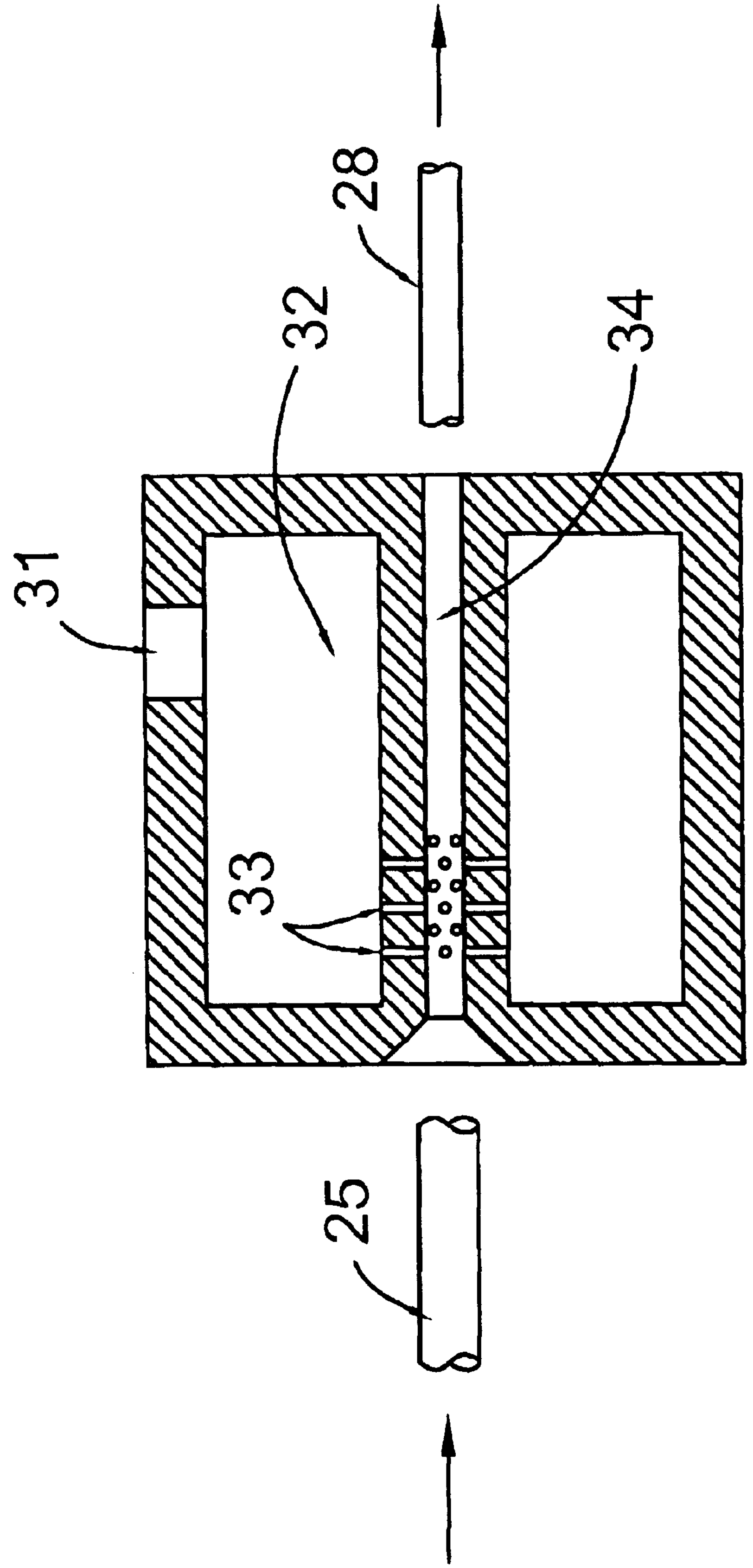
FIG. 1 is a cross-sectional view of one form of application and forming die useful in a process line for producing fibrous products according to this invention.

Other and further objects, features and advantages of the invention will become apparent from the ensuing description and claims taken in conjunction with the attached drawings.

DETAILED DESCRIPTION OF THE PREFERRED EMBODIMENTS

In describing preferred embodiments of the invention specific terminology will be resorted to for the sake of clarity. However, the invention is not intended to be limited to the specific terms so-selected, and it is to be understood that each specific term includes all technical equivalents which operate in a similar manner to accomplish a similar purpose.

As indicated above, the instant inventive concepts are broadly related to the application of an additive material to a fibrous surface to change or alter the surface characteristics of the fibers or the properties of a product formed therefrom in many commercial environments. However, since a particular commercially significant application of these concepts is in the production of ink reservoir elements wherein a surfactant is applied to a fibrous web to alter the ink-holding and releasing properties of the products produced therefrom, the following detailed description will focus on the use of the method and means of this invention in the production of ink reservoir elements for marking and writing instruments comprising polyethylene terephthalate sheath/polypropylene core bicomponent fibers which have been melt blown by a high velocity air stream as the fibers emanate from the spinerette orifices and while they are still molten. Techniques for the production of such fibrous webs are well known, but particularly effective, highly uniform, homogeneous webs of such materials can be produced by the bimodal or mixed fiber concepts described in the '181 patent referred to above and bonded by steam to form elongated porous elements which, when cooled, can be incorporated into the barrel of a pen or the like and filled with a quantity of ink.

Exemplary processing lines for the formation of fibrous products are seen in many prior art patents, for example, the '766 and '181 patents identified above. Such processing lines may comprise a conventional melt blown fiber spinning apparatus which, if the product to be made is an ink reservoir, can extrude monocomponent fibers formed from polyesters such as polyethylene terephthalate or bicomponent fibers comprising a polyester sheath and a polypropylene or other thermoplastic core as described in any of the aforementioned patents adapted for extruding bicomponent fibers of such materials, particularly the '766 patent.

Regardless of the nature of the extruded fibers, if melt blown, they are preferably attenuated by a high velocity air stream enabling the production of fine fibers, on the order of 12 microns or less, which are continuously collected as a band-like, non-woven filament bundle in the form of a randomly dispersed entangled web or roving on a conveyor belt or a conventional screen covered vacuum collection drum or other moving surface which separates the fibrous web from entrained air to facilitate further processing.

The web is then conveyed through a series of processing stations, commonly passing through a collection die which brings the bundle of fibers closer to its finished size to produce a rod-like element which enters an application and forming die where the fibers are bonded to each other at their points of contact by steam or the like to produce a continuous element carried through a standard cooling and drying station. This process produces a relatively self-sustaining highly porous fiber rod may be cut to appropriate lengths of final product for packing or subsequent use.

It is to be understood that the foregoing description of a process line is only exemplary and to not intended to include each and every element that may be necessary for treating particular polymeric materials in the formation of porous rods for different applications.

A typical steam-treating and forming die for use in a process line of the type described is seen at 30 in FIG. 1 and comprises an inlet port 31 for the steam or other heating fluid which enters under pressure and is then equilibrated within the die plenum 32 for passage through a series of application ports 33 into the die profile bore 34 wherein it forms a non-woven bundle 25 into a continuous element 28 in a well-known manner. The ports 33 may be diametric as shown or angled toward the inlet or outlet of the bore 34 depending upon the particular processing technology in use.

Figure 2:
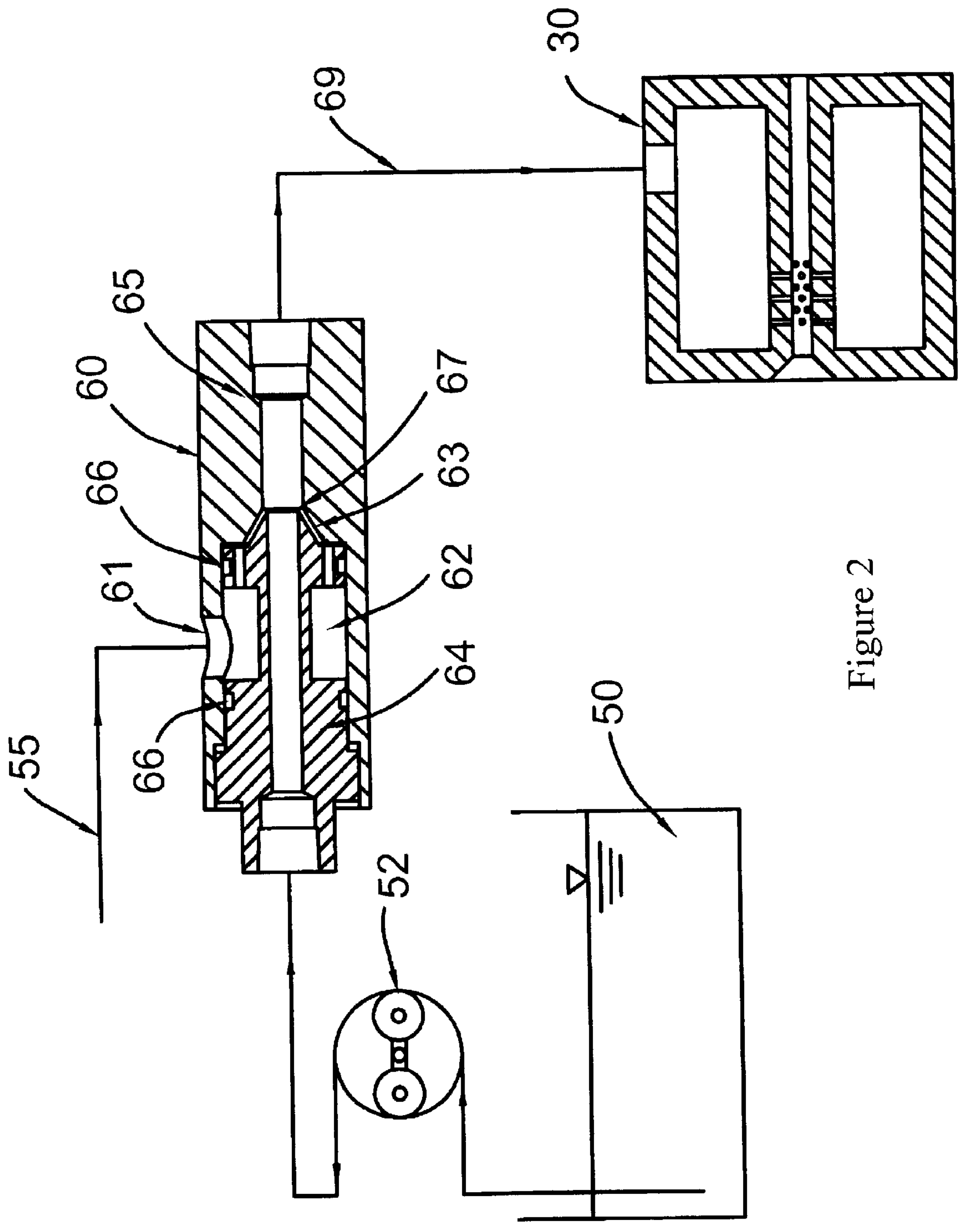
FIG. 2 is a schematic view of a portion of the process line wherein an additive material is drawn into the heating medium through a venturi and carried by the heating medium into the forming station.

As seen with particular reference to FIG. 2 according to the preferred techniques of this invention, an additive material, such as a surfactant, is fed from an additive supply reservoir 50 through a standard peristaltic metering pump 52 into an adjustable-flow additive venturi assembly 60. The steam or other pressurized heating fluid transport medium 55 is supplied via the transport media inlet port 61 to the venturi assembly 60 where it enters the plenum chamber 62, undergoing pressure equilibration, before proceeding toward the converging nozzle 63 formed by the complementary threaded male 64 and female 65 portions forming a flow contraction of the venturi assembly 60 sealed by O-rings 66. The flow of steam loses pressure and accelerates through the decreasing nozzle cross-section which can be adjusted by rotating the elements 64, 65 with respect to each other to produce a favorable pressure gradient and a region of low pressure at the nozzle exit 67. The pressure gradient aspirates the additive from the reservoir 50 entraining the additive in the high-speed transport flow of the steam so that the additive is carried by the steam along fluid transport lines 69 to the application and forming die 30 where the steam-additive mixture is fed into the inlet port 31.

The use of the steam-aspirated application apparatus according to this invention enables the application of undiluted fluid additives at relatively low supply rates to a melt blown or other non-woven web or bundle of banded tow or self-crimping yarns during or prior to the forming operation. Thus, the steam or other heating fluid performs a dual function, both carrying the additive material to and into the fibrous bundle to uniformly incorporate the additive into the final product in a substantially dry process, and simultaneously, bonding the fibers to each other at their spaced points of contact. Thus, this system avoids the time and expense of diluting the additive material, adding the same to the fibrous bundle by flooding a die with high volumetric quantities of diluted additive solution to ensure that the additive penetrates the fibrous bundle, and then attempting to air strip or otherwise dry the soaked fibers, wasting significant additive and unnecessarily slowing the formation of the final product.

Figure 3:
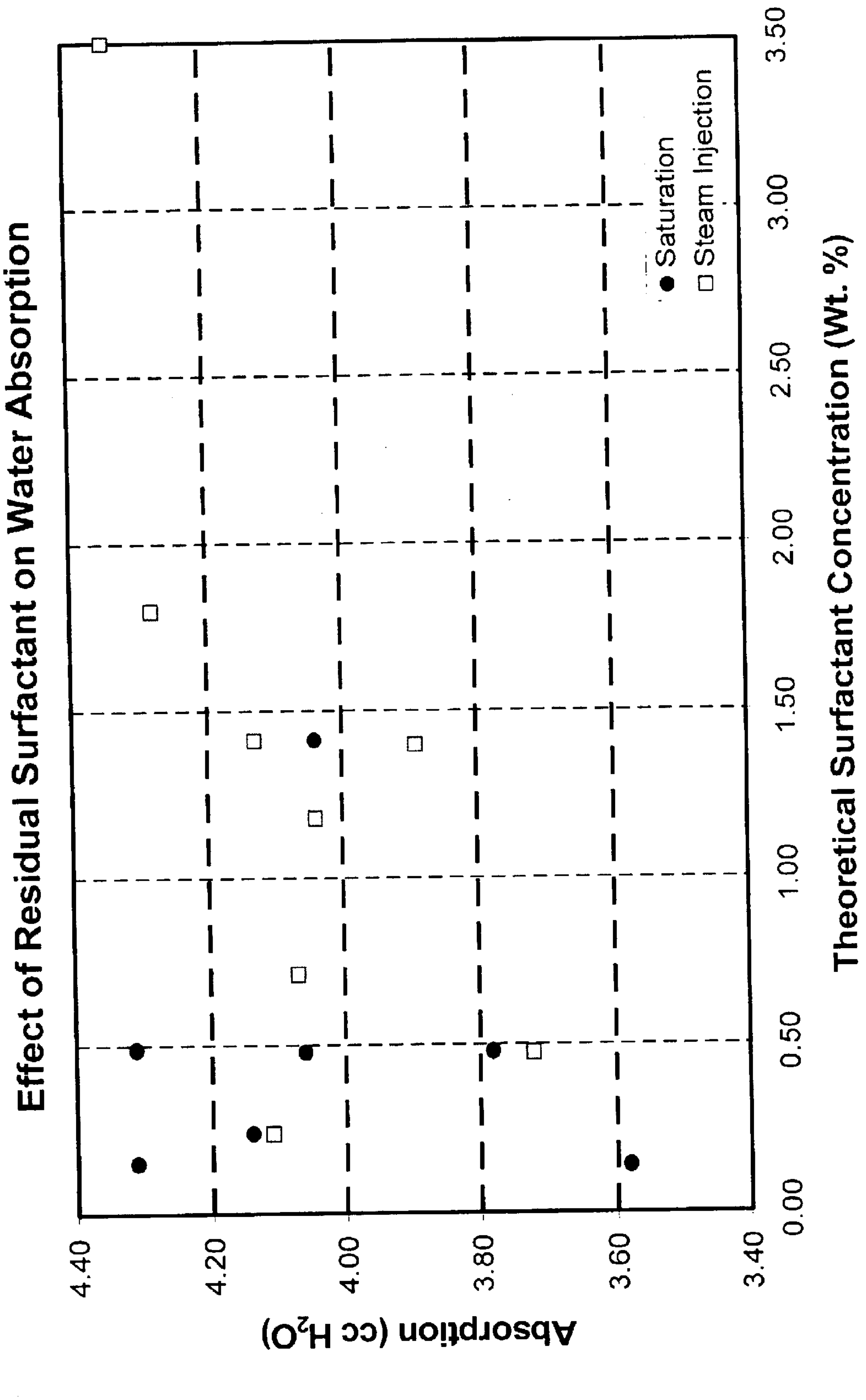
FIG. 3 is a graphic illustration comparing surfactant concentration and its effect on liquid absorption in a reservoir element formed using the prior art technique of saturating a formed fibrous element with additive and subsequently removing excess additive with an air-stripping tool, with a product formed using the process of the instant invention wherein the surfactant is added by steam injection.
Figure 4:
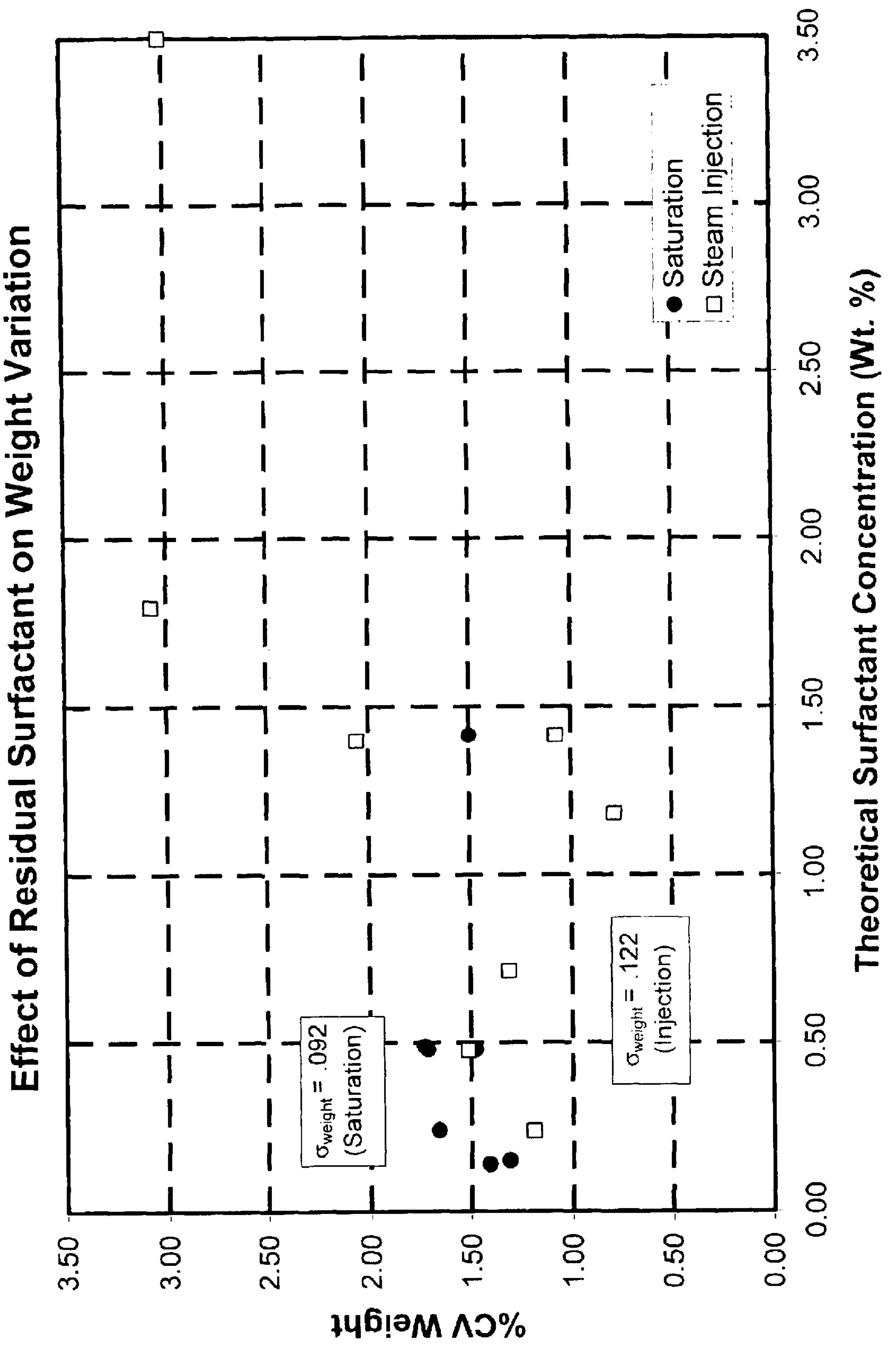
FIG. 4 is a graphic illustration comparing weight variation in products produced using the prior art and instant techniques.

It can be seen from FIG. 3 that the liquid absorption of the products of the steam-injected application method of this invention closely follows that of products of the more time-consuming and expensive traditional technique for incorporating additive. Moreover, the steam-aspirated techniques yielded nearly equitable weight consistency as seen in FIG. 4, indicating reliable application rates and manageable process conditions.

The foregoing descriptions and drawings should be considered as illustrative only of the principles of the invention. Numerous applications of the present invention will readily occur to those skilled in the art. Therefore, it is not desired to limit the invention to the preferred embodiments or the exact construction and operation of the preferred apparatus shown and described. Rather, all suitable modifications and equivalents may be resorted to, falling within the scope of the invention.

What is claimed is:

1. In a method for incorporating an additive material into a fibrous web wherein the fibers in the web are bonded to each other at spaced points of contact to form a porous element by application of a fluid heating medium, the improvement which comprises admixing the additive material with the heating medium, and then contacting the web of fibers with the mixture of heating medium and additive material, whereby the heating medium simultaneously carries the additive material into the fibrous web and heats the fibers in the web to bond the fibers to each other at spaced points of contact to form the porous element.

2. The improvement of claim 1 wherein a controlled quantity of additive material is drawn from a source of such additive material and fed into a stream of the heating medium to form the mixture of heating medium and additive material.

3. The improvement of claim 2 wherein the quantity of additive material is metered and then passed through an adjustable venturi assembly to draw the additive material into the stream of the heating medium.

4. The improvement of claim 3, wherein the heating medium is fed into a decreasing nozzle cross-section of the venturi assembly to accelerate the flow of the heating medium and produce a region of low pressure at the nozzle exit, aspirating a controlled quantity of the additive material from the source of such material by the resulting pressure gradient to entrain the additive material in the flowing heating medium so that the additive material is carried by the heating medium, and then contacting the web of fibers with the mixture of heating medium and additive material.

5. The improvement of claim 1, wherein the fibrous web is formed into the porous element by passing the web of fibers through an elongated confined forming zone, and the web of fibers is contacted with the mixture of heating medium and additive material by injecting said mixture into the forming zone as the web of fibers passes therethrough.

6. The improvement of claim 5, wherein the forming zone is defined by an elongated opening in a forming die, and the mixture of heating medium and additive material is peripherally injected into said opening at an angle to the direction of travel of the web of fibers.

7. The improvement of claim 6, wherein said mixture is injected diametrically into said opening.

8. The improvement of claim 1, wherein the additive material comprises a liquid material adapted to alter the surface properties of the fibers in the web.

9. The improvement of claim 1 wherein the fibers in the web are melt blown fibers and the additive material is a liquid material adapted to alter the surface properties of the fibers.

10. The improvement of claim 9, wherein the porous element is to be used as an ink reservoir for a marking or writing instrument and said additive material is a surfactant that modifies the surface characteristics of the fibers to enhance absorptiveness and/or compatibility with particular ink formulations.

11. The improvement of claim 10, wherein said heating medium is steam.

12. The improvement of claim 11, wherein the fibers in the web comprise at least a surface of a polyester polymer.

13. The improvement of claim 12, wherein said polyester polymer is polyethylene terephthalate.

14. The improvement of claim 13, wherein said fibers are bicomponent sheath/core fibers and said sheath comprises polyethylene terephthalate.

15. The improvement of claim 14, wherein said bicomponent fibers have a core of polypropylene.

16. The improvement of claim 14, wherein said bicomponent fibers have a core of polybutylene terephthalate.

17. The improvement of claim 8, wherein the fibers in said web comprise at least a surface of cellulose acetate and the additive material comprises a plasticizer.

18. A method of making an ink reservoir for a marking or writing instrument, comprising melt blowing a web of fibers having at least a surface of polyethylene terephthalate, entraining a quantity of a surfactant that modifies the surface characteristics of the fibers to enhance absorptiveness and/or compatibility with particulate ink formulations in a flowing stream of steam and then contacting the web of fibers with the mixture of steam and surfactant to simultaneously carry the surfactant into the fibrous web and heat the fibers in the web with the steam to bond the fibers to each other at spaced points of contact to form a porous element which may be subdivided for use as an ink reservoir.

19. The method of claim 18 wherein the surfactant is metered and then passed through an adjustable venturi assembly to draw the surfactant into the stream of the steam.

20. The method of claim 18, wherein the steam is fed into a decreasing nozzle cross-section of the venturi assembly to accelerate the flow of steam and produce a region of low pressure at the nozzle exit, aspirating a controlled quantity of the surfactant from a source of such material by the resulting pressure gradient to entrain the surfactant in the flowing steam so that the surfactant is carried by the steam, and then contacting the web of fibers with the mixture of steam and surfactant.

21. The method of claim 18, wherein the fibrous web is formed into the porous element by passing the web of fibers through an elongated confined forming zone, and the web of fibers is contacted with the mixture of steam and surfactant by injecting said mixture into the forming zone as the web of fibers passes therethrough.

22. The method of claim 18, wherein the fibers in the web comprise at least a surface of a polyethylene terephthalate.

23. The method of claim 22, wherein said fibers are bicomponent sheath/core fibers, and said sheath comprises polyethylene terephthalate.

24. The method of claim 23, wherein said bicomponent fibers have a core of polypropylene.

* * * * *